United States Patent
Hall et al.

(10) Patent No.: US 9,874,630 B2
(45) Date of Patent: Jan. 23, 2018

(54) EXTENDED RANGE GATED TIME OF FLIGHT CAMERA

(71) Applicant: Microsoft Technology Licensing, LLC., Redmond, WA (US)

(72) Inventors: Michael Hall, Bellevue, WA (US); Algird Gudaitis, Fall City, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 354 days.

(21) Appl. No.: 14/609,475

(22) Filed: Jan. 30, 2015

(65) Prior Publication Data

US 2016/0223656 A1    Aug. 4, 2016

(51) Int. Cl.
| | |
|---|---|
| *G01S 7/486* | (2006.01) |
| *G01B 11/14* | (2006.01) |
| *H04N 5/235* | (2006.01) |
| *G01S 17/08* | (2006.01) |
| *G01S 17/89* | (2006.01) |
| *G01N 21/86* | (2006.01) |
| *G01S 17/10* | (2006.01) |

(52) U.S. Cl.
CPC .......... *G01S 7/4868* (2013.01); *G01B 11/14* (2013.01); *G01S 7/4865* (2013.01); *G01S 17/08* (2013.01); *G01S 17/107* (2013.01); *G01S 17/89* (2013.01); *H04N 5/2353* (2013.01)

(58) Field of Classification Search
CPC ........ G01S 7/4868; G01S 17/08; G01S 17/89; H04N 5/2353; G01B 11/14
USPC ........................................ 348/140
See application file for complete search history.

(56) References Cited

U.S. PATENT DOCUMENTS

| | | |
|---|---|---|
| 4,963,017 A | 10/1990 | Schneiter et al. |
| 8,724,921 B2 | 5/2014 | Jin |
| 8,786,678 B2 | 7/2014 | Schmidt et al. |
| 2006/0114333 A1 | 6/2006 | Gokturk et al. |
| 2006/0214121 A1 | 9/2006 | Schrey et al. |
| 2010/0026850 A1* | 2/2010 | Katz ........................ G01S 17/89 348/234 |
| 2011/0187826 A1* | 8/2011 | Felzenshtein ............ G01C 3/08 348/46 |
| 2012/0287242 A1 | 11/2012 | Gilboa et al. |

(Continued)

FOREIGN PATENT DOCUMENTS

| | | |
|---|---|---|
| EP | 2594959 A1 | 5/2013 |
| EP | 2804011 A1 | 11/2014 |
| WO | 2013104717 A1 | 7/2013 |

OTHER PUBLICATIONS

"International Preliminary Report on Patentability Issued in PCT Application No. PCT/US2016/013503", dated Dec. 15, 2016, 7 pages.

(Continued)

*Primary Examiner* — Hee-Yong Kim
(74) *Attorney, Agent, or Firm* — A. C. Entis-IP Ltd.

(57) ABSTRACT

A gated time of flight (GT-TOF) range camera that transmits a plurality of light pulses to illuminate features in a scene and gates ON a photosensor in the camera for one multi-exposure gate having a plurality of exposure periods following each of the plurality of light pulses to register amounts of light reflected by features in the scene from the light pulses and uses the registered amounts of light to determine distances to the features.

18 Claims, 7 Drawing Sheets

(56) References Cited

U.S. PATENT DOCUMENTS

2013/0235160 A1    9/2013   Cohen et al.
2014/0152975 A1    6/2014   Ko

OTHER PUBLICATIONS

Banos, et al,"Computing Depth Under Ambient Illumination Using Multi-Shuttered Light", In Proceeding of the IEEE Computer Society Conference on Computer Vision and Pattern Recognition vol. 2, Jun. 2004, 8 pages.
Li, Larry, "Time-of-Flight Camera—An Introduction", In Technical White Paper, Jan., 2014, 10 pages.
Yu, et al., "Improveing Depth Estimation Through Fusion of Stereo and TOF", In Proceeding of the International conference on Multimedia Technology, Jul. 26, 2011, 5 pages.
Overton, Gail, "Single-Photon Depth System Images Targets 1 km Away", Published on: Apr. 4, 2013, Available at: http://www.laserfocusworld.com/articles/2013/04/single-photon-tof-depth-imaging-1km.html.
Gokturk, et al., "A Time-Of-Flight Depth Sensor—System Description, Issues and Solutions", In Proceeding of the Conference on Computer Vision and Pattern Recognition Workshop, Jun. 27, 2004, 9 pages.
McClure, et al., "Resolving Depth-Measurement Ambiguity with Commercially Available Range Imaging Cameras", In Proceeding of the SPIE 7538, Image Processing: Machine Vision Applications III, Jan. 28, 2010, 3 pages.
International Search Report and Written Opinion Issued in PCT Patent Application No. PCT/US2016/013503, dated Apr. 7, 2016, 15 Pages.

\* cited by examiner

EXTENDED RANGE GATED TIME OF FLIGHT CAMERA

BACKGROUND

A gated time of flight (GT-TOF) range camera determines distances to features in a scene that it images by illuminating the scene and gating ON for a short exposure period to register amounts of light from the illumination that features in the scene reflect back to the camera. The camera uses an amount of reflected light from a given feature in the scene that the camera images during the short exposure period to determine a round trip time, $t_R$, for light to travel from the camera to the given feature and back to the camera. The round trip time $t_R$ for the feature and the speed of light are used to determine a distance to the feature.

SUMMARY

An aspect of an embodiment of the disclosure relates to providing a GT-TOF camera for imaging and determining distances to features in a scene having an extended depth range. The extended depth range is provided by a gating configuration comprising at least one pulse train of transmitted light pulses that the camera transmits to illuminate the scene and a plurality of different gates, during which the camera is gated ON to register light. The plurality of gates may comprise at least one multi-exposure gate and at least one single-exposure gate. Two gates are different if they are initiated by the GT-TOF camera at different $T_{on}$ times following a transmitted light pulse in the at least one pulse train and/or if they have different time dependences once initiated. A multi-exposure gate is a gate having a plurality of N different exposure periods during which the GT-TOF camera is sensitive to light and pixels in the camera photosensor register light incident on the pixels. The N exposure periods are separated by (N−1) intra-gate hiatuses during which the camera is gated OFF and insensitive to light. During a multi-exposure gate following a given transmitted light pulse in the at least one pulse train, pixels in the GT-TOF camera register light reflected from the given light pulse by features in the scene independent of the exposure period of the multi-exposure gate during which the reflected light reaches the pixels. In an embodiment the at least one light pulse train comprises as many light pulse trains as there are different gates, and each different gate is associated with a single one of the light pulse trains. Optionally, the gating configuration comprises a plurality of four different gates comprising two multi-exposure gates and two single-exposure gates, each of the gates having a different $T_{on}$ ON time. In an embodiment, the multi-exposure gates are binary-exposure gates comprising two exposure periods separated by a hiatus. Optionally, a gating configuration in accordance with an embodiment comprises at least one multi-exposure gate having at least three exposure periods.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the description below features of a GT-TOF camera that operates to acquire a range image of a scene using a gating configuration in accordance with an embodiment of the disclosure are discussed with reference to FIG. 1. Features of temporal relationships between transmitted light pulses in four pulse trains that the GT-TOF camera transmits to illuminate the scene, light pulses reflected from the transmitted light pulses by features in the scene imaged by the GT-TOF camera, and binary and single-exposure gates are discussed with reference to FIGS. 2A-2E. A gating configuration having three binary exposure gates and one single-exposure gate in accordance with an embodiment of the disclosure is introduced in a discussion of FIG. 3.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated explicitly or by context, the word "or" in the description and claims is considered to be the inclusive "or" rather than the exclusive or, and indicates at least one of, or any combination of items it conjoins.

Figure 1:
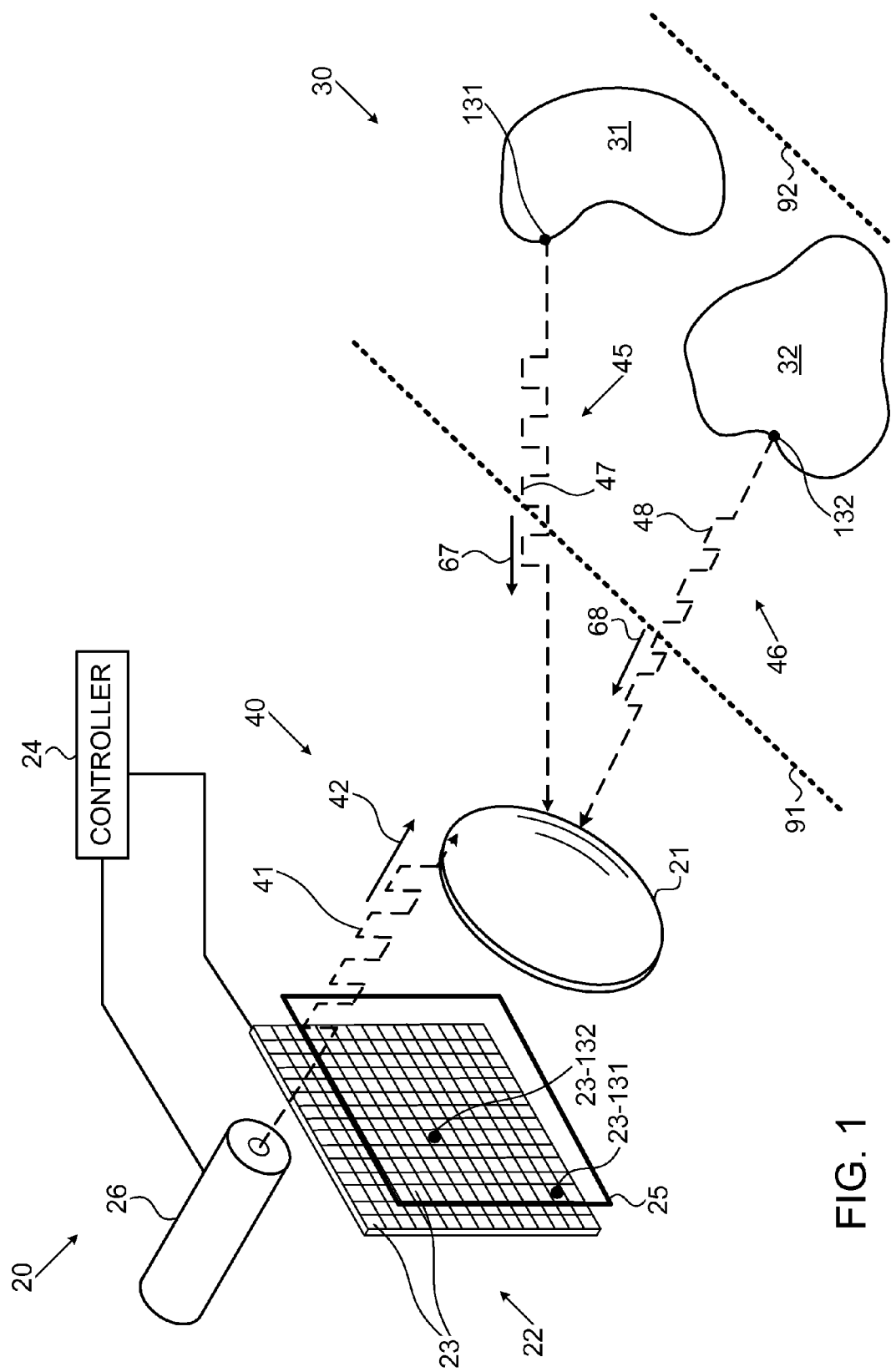
FIG. 1 schematically shows a GT-TOF camera transmitting a train of light pulses to illuminate a scene and determine distances to feature in the scene, in accordance with an embodiment of the disclosure.

FIG. 1 schematically shows a GT-TOF camera 20 operating to determine distances to features in a scene 30 having objects 31 and 32, in accordance with an embodiment of the disclosure. GT-TOF camera 20, which is shown very schematically, comprises an optical system represented by a lens 21, and a photosensor 22 having pixels 23 on which the lens system images scene 30. GT-TOF camera 20 optionally comprises a shutter 25 for shuttering or gating the camera ON and OFF, a light source 26, and a controller 24 that controls shutter 25 and light source 26. Whereas GT-TOF camera 20 is schematically shown having a shutter 25 separate from photosensor 22, a GT-TOF camera may comprise a photosensor that includes circuitry operable to gate ON and gate OFF the photosensor and thereby the camera. A reference to shuttering or gating ON, or shuttering or gating OFF a GT-TOF camera is understood to include shuttering or gating the camera, or a pixel or pixels in the camera photosensor, ON and OFF using any methods or devices known in the art, irrespective of whether or not specific reference is made to a "separate" shutter.

To determine distances to features in scene 30, controller 24 controls GT-TOF camera 20 to transmit at least one pulse train of light pulses to illuminate the scene and gate ON and gate OFF photosensor 22 following each of a plurality of light pulses in each of the at least one light pulse train, in accordance with a gating configuration that conforms with an embodiment of the disclosure.

In an embodiment, the at least one pulse train comprises a plurality of light pulse trains, and by way of example, controller 24 is assumed to control light source 26 to transmit a plurality of optionally four light pulse trains to illuminate scene 30 and determine distances to features in the scene. At a time following a predetermined delay after each of a plurality of light pulses in a given pulse train of the plurality of pulse trains is transmitted, controller 24 controls shutter 25 to gate ON photosensor 22 for a gate associated with the given pulse train. During the gate, pixels 23 in photosensor 22 register light reflected from the transmitted light pulse by features in scene 30 that are respectively imaged on the pixels and incident on photosensor 22 during the gate. An amount of light registered by a pixel 23 on which a feature of scene 30 is imaged is proportional to a correlation in time of the reflected light pulse and the gate. The correlation in time is a function of a round trip time, $t_R$, for light to travel from GT-TOF camera 20 to the feature and back to the camera.

A pixel in a camera photosensor, such as a pixel 23 in photosensor 22, registers an amount of incident light by accumulating positive or negative electric charge, also referred to as "photocharge", provided by electron-hole pairs generated by photons in the incident light. Circuitry in the TOF camera converts photocharge accumulated by the pixels into voltages that are used as measures of the amounts of photocharge they respectively accumulate. A set of voltages representing the accumulated photocharges and corresponding amounts of light registered by the pixels may be referred to as a "frame" of the photosensor. Acquiring a frame of a photosensor may be referred to as "reading" the photosensor, reading the pixels, or reading the photocharge in the pixels. An amount of light that a pixel registers may refer to an amount of optical energy incident on the pixel, an amount of photocharge accumulated by a pixel responsive to incident light, or to any representation of the accumulated photocharge, such as by way of example a voltage, current, or digital data generated responsive to the accumulated photocharge.

In FIG. 1, by way of example, GT-TOF camera 20 is schematically shown transmitting a pulse train 40 of the plurality of transmitted pulse trains that GT-TOF camera 20 transmits to illuminate scene 30. Pulse train 40 comprises transmitted light pulses 41, schematically represented by rectangular pulses associated with an overhead arrow 42 indicating direction of propagation of the light pulses. In practice, light pulses 41 are generally not rectangular, may have irregular pulse shapes, and may for example have rising and falling edges that resemble curves that describe a capacitor charging and discharging respectively. Light pulses 41 optionally have pulse widths between about 1 and 20 ns (nanoseconds).

Features in scene 30 reflect light from each transmitted light pulse 41 back towards GT-TOF camera 20 as reflected light pulses. In FIG. 1, objects 31 and 32 have features 131 and 132 respectively that are schematically shown reflecting light from transmitted light pulses 41 as trains 45 and 46 of reflected light pulses 47 and 48 respectively. Overhead arrows 67 and 68 schematically indicate direction of propagation of light pulses 47 and 48, respectively. Each reflected light pulse, 47 and 48, has reduced intensity compared to the transmitted light pulse 41 from which it was reflected but substantially a same pulse shape as the transmitted light pulse.

Light in reflected light pulses 48 from feature 132 is imaged on a pixel 23-132. If the light in a reflected light pulse 48 reaches pixel 23-132 during the gate that follows the transmitted light pulse from which light in the reflected light pulse is reflected by feature 23, the pixel registers the light. An amount of the light that pixel 23-132 registers is proportional to a time correlation of reflected light pulse 48 and the gate, which as noted above is a function of a round trip time $t_R$ of light from light source 26 to feature 23 and back to camera 20. If all the light in reflected light pulse 48 reaches GT-TOF camera 20 before or after the gate, pixel 23-132 does not register light from the reflected light pulse. Similarly, light from feature 131, which is schematically shown farther from GT-TOF camera 20 than feature 132, is imaged on a pixel 23-131. An amount of light from a reflected light pulse 47 reflected by feature 131 that is registered by pixel 23-131 is proportional to a time correlation of the reflected light pulse with the gate following the transmitted light pulse 41 from which light in the reflected light pulse is reflected by feature 131. Pixel 23-131 does not register light from reflected light pulse 47 if the light reaches the camera before or after the gate.

If no light reflected by a feature in scene 30 from the plurality of light pulse trains transmitted by GT-TOF camera 20 to illuminate scene 30 is registered by a pixel 23 on which the feature is imaged, the feature is located at a distance from GT-TOF camera 20 that is outside a maximum depth range, "DR-M", of the camera. For a feature outside of the maximum depth range DR-M of GT-TOF camera 20, the camera does not provide time of flight information useable to determine a distance from the camera at which the feature may be located, except possibly to provide information that the feature is out of range of the camera. Lower and upper bound distances that delimit the maximum depth range DR-M of GT-TOF camera 20 are schematically indicated by dashed lines 91 and 92. A gating configuration in accordance with an embodiment may provide an advantageous depth range for GT-TOF camera 20.

Figure 2A:
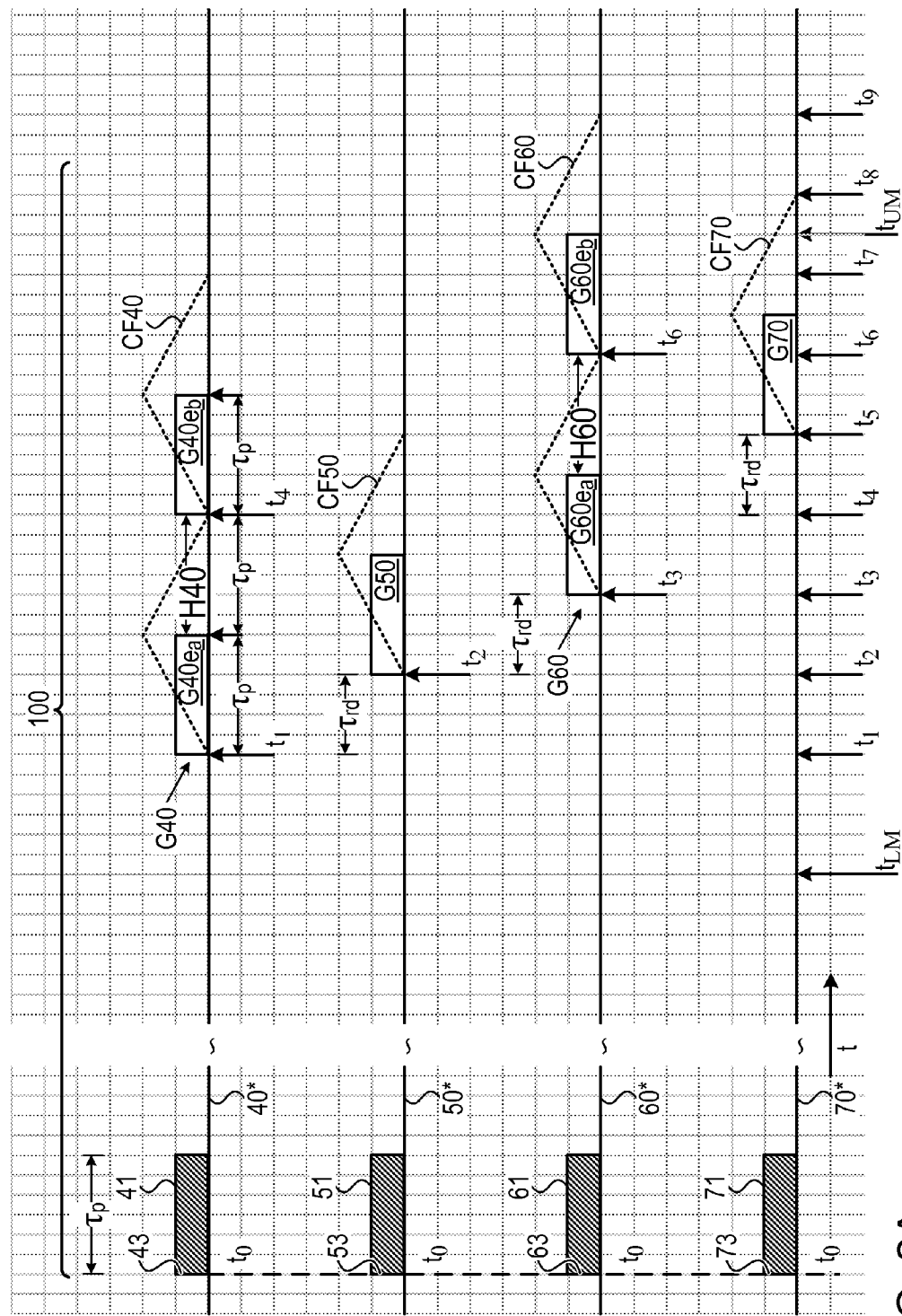
FIG. 2A shows a schematic time line graph illustrating a gating configuration comprising multi-exposure and single-exposure gates and four trains of transmitted light pulses that the GT-TOF camera may use to image the scene shown in FIG. 1 and determine distances to features in the scene, in accordance with an embodiment of the disclosure.

By way of example GT-TOF camera 20 is assumed to be imaging scene 30 using a gating configuration 100 in accordance with an embodiment of the disclosure schematically illustrated in FIG. 2A. Gating configuration 100 optionally comprises a plurality of four light pulse trains, including light pulse train 40 shown in FIG. 1, and three pulse trains referred to as pulse trains 50, 60, and 70 (not shown in FIG. 1), two multi-exposure gates which are optionally binary-exposure gates, and two single-exposure gates. Features of gating configuration 100 are shown in FIG. 2A and figures that follow along times lines 40*, 50*, 60* and 70*, associated with pulse trains 40, 50, 60, and 70 respectively. Gates associated with each light pulse train 40, 50, 60, and 70 are shown along time lines 40*, 50*, 60* and 70* respectively, relative to transmission times represented by a nominal time $t_o$ at which a light pulse in each of the light pulse trains is transmitted by light source 26. A shaded rectangle 41 represents a single, representative transmitted light pulse in light pulse train 40 transmitted by light source 26 at a transmission time of the pulse represented by $t_o$. Transmitted light pulse 41 is therefore shown with its leading edge located at time $t_o$. Similarly, shaded rectangles 51, 61, and 71 represent, single, representative transmitted light pulses in light pulse trains 50, 60 and 70. Representative light pulses 51, 61, and 71 are transmitted at times represented by $t_o$ and have their respective leading edges located at $t_o$. Transmitted light pulses 41, 51, 61, or 71 optionally have a same pulse width $\tau_p$. An exposure period of a gate associated with transmitted light pulses in light pulses trains 40, 50, 60, and 70, such as transmitted light pulses 41, 51, 61, and 71, is schematically represented by a rectangle along time line, 40*, 50*, 60* and 70* respectively associated with the pulse train. The exposure periods of gates comprised in gating configuration 100 optionally have a substantially same duration, substantially equal to pulse width $\tau_p$.

Pulse train 40 is optionally associated with a binary-exposure gate G40 comprising exposure periods $G40e_a$ and $G40e_b$ separated by a hiatus H40 optionally having a duration substantially equal to duration $\tau_p$ of exposure periods $G40e_a$ and $G40e_b$. Pulse train 50 is optionally associated with a single-exposure gate G50. Pulse train 60 is associated with a binary-exposure gate G60 comprising exposure periods $G60e_a$ and $G60e_b$ separated by a hiatus H60, optionally having a duration substantially equal to duration $\tau_p$ of exposure periods $G60e_a$ and $G60e_b$. And pulse train 70 is optionally associated with a single-exposure gate G70.

ON times at which GT-TOF camera 20 is gated ON following a transmitted light pulse in a given pulse train 40, 50, 60 or 70 for exposure periods of the gates associated with the given pulse train may be different than ON times for a pulse train 40, 50, 60, or 70 different from the given pulse train. For example, an ON time of an exposure period associated with light pulse 41 in pulse train 40, relative to a transmission time $t_o$ of the light pulse, is different than an ON time of an exposure period associated with light pulse 51 transmitted in pulse train 50, relative to the transmission time $t_o$ of light pulse 51.

Each ON time of an exposure period shown in FIG. 2A is labeled by a subscripted time, $t_j$. Larger values for the subscript "j" indicate later ON times for an exposure period relative to a transmission time of a light pulse with which the exposure period is associated. Optionally, as shown in FIG. 2A, any two "sequential" ON times $t_j$ are separated by a same relative time delay $\tau_{rd}$. In an embodiment, delay time $\tau_{rd}$ may be equal to one third of a time lapse between an ON time of a first exposure period of a multi-exposure gate and an ON time of an immediately subsequent exposure period of the multi-exposure period gate. For a gating configuration for which a hiatus of a multi-exposure gate has duration equal to that of a first exposure period of the multi-exposure gate, $\tau_{rd}$ has a duration equal to (⅔) of a duration of the first exposure period. By way of example, for gating configuration 100, exposure period $G40e_a$ and hiatus H40 have a same duration equal to $\tau_p$, and as a result $\tau_{rd}$ is optionally equal to $(⅔)\tau_p$. An earliest ON time of gating configuration 100 is ON time $t_1$ of exposure period $G40e_a$ of binary-exposure gate G40 that follows a transmission time $t_o$, of light pulse 41. ON time $t_1$ relative to the transmission time of light pulse 41 is earlier by a time interval $T_{rd}=(⅔)\tau_p$ than an ON time $t_2$ of gate G50 that follows transmission of light pulse 51 relative to a transmission time of light pulse 51. And an ON time $t_4$ of exposure period $G40e_b$ of gate G40 that follows transmission of light pulse 41 is optionally delayed by a relative time delay $\tau_{rd}=(⅔)\tau_p$ with respect to an ON time $t_3$ of exposure period $G60e_a$ of binary gate G60 that follows transmission of light pulse 61.

A dotted line CF40 represents a time correlation function of binary-exposure gate G40 with a reflected light pulse, such as a reflected light pulse 47 or 48 shown in FIG. 1, reflected from transmitted light pulse 41 by a feature in scene 30. Correlation function CF40 is shown as a function of a time at which a trailing edge of the reflected light pulse reaches GT-TOF camera 20. Correlation function CF40 has maxima when the leading edge of a reflected light pulse from scene 30 is at time $t_1$ or $t_4$, for which times the reflected light pulse is coextensive with exposure period $G40e_a$ or $G40e_b$ respectively. When the trailing edge of a reflected light pulse occurs at a time substantially equal to or less than $t_1$, the reflected light pulse reaches GT-TOF camera 20 before binary-exposure gate G40 begins and CF40 is equal to zero. When the trailing edge is located at $t_1$, the leading edge of the pulse is at a time $(t_1-\tau_p)$. Time $(t_1-\tau_p)$ is an earliest time relative to $t_o$ for which GT-TOF camera 20 can register light from scene 30 using gating configuration 100, and at time $(t_1-\tau_p)$ correlation function CF40 equals zero. Time $(t_1-\tau_p)$ therefore is equal to a smallest round trip time $t_R$ for which GT-TOF camera 20 registers light from a feature in scene 30. Distance $(t_1-\tau_p)c/2$ is therefore substantially equal to a nearest location to GT-TOF camera 20 of a feature in scene 30 for which the camera can provide time of flight distance information for the feature. Time $(t_1-\tau_p)$ therefore defines a lower bound distance "$D_{LM}$" of a maximum depth range DR-M of GT-TOF camera 20 operating under gating configuration 100, and is indicated in FIG. 2A and figures that follow as a time $t_{LM}$. Similarly, a time $t_{UM}=(t_6+\tau_p)$ is a largest round trip time $t_R$, and defines an upper bound distance $D_{UM}=(t_6-\tau_p)c/2$ of the maximum depth range, DR-M, for which GT-TOF camera 20 can provide time of flight distance information for a feature in scene 30. For round trip times equal to or greater than $t_{UM}$ correlation function CF60 equals zero. Dotted lines CF50, CF60, and CF70 similarly represent correlation functions of gates G50, G60, and G70 respectively with light pulses reflected from transmitted light pulses 51, 61, and 71.

Figure 2B:
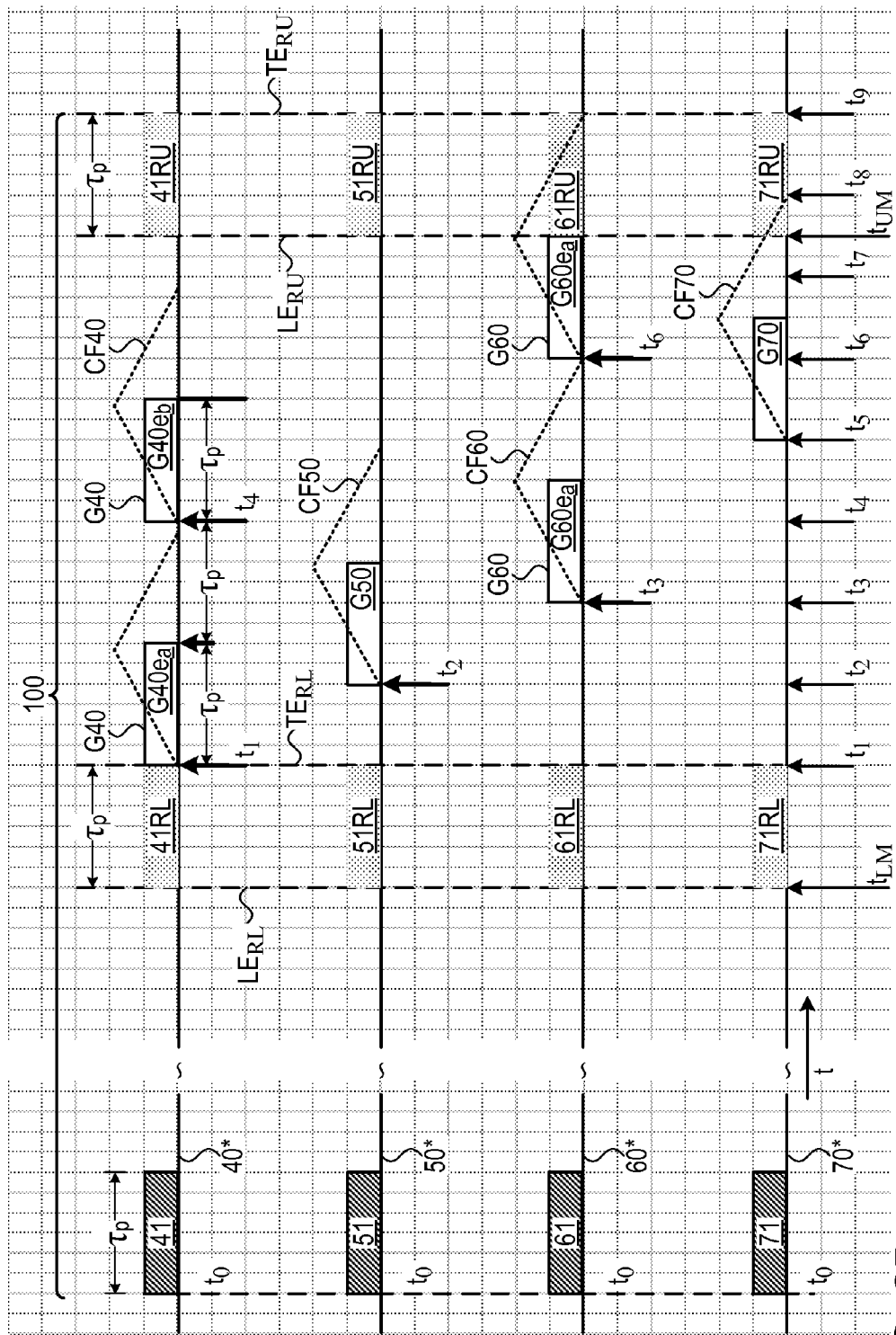
FIG. 2B shows a schematic time line graph of the gating configuration shown in FIG. 2A that illustrates temporal relationships between the multi and single exposure gates and light pulses reflected from features in the scene that are located at upper and lower bound distances of a depth range of the GT-TOF camera determined by the gating configuration, in accordance with an embodiment of the disclosure.

FIG. 2B schematically illustrates timing relative to gates G40, G50, G60 and G70 of light pulses reflected from transmitted light pulses 41, 51, 61, and 71 by features in scene 30 that are located at lower and upper bound distances $D_{LM}$ and $D_{UM}$ of the depth range DR-M of GT-TOF camera 20. Reflected light pulses reflected from transmitted light pulses 41, 51, 61, and 71 by a feature located at a lower bound distance $D_{LM}$ from GT-TOF camera 20 are represented by shaded rectangles 41RL, 51RL, 61RL, and 71RL respectively along time lines 40*, 50*, 60*, and 70*. Leading and trailing edges of reflected light pulses 41RL, 51RL, 61RL, and 71RL are indicated by dashed lines associated with the pulses and respectively labeled "$LE_{RL}$" and "$TE_{RL}$".

Reflected light pulses reflected from transmitted light pulses 41, 51, 61, and 71 by a feature at upper bound distance $D_{UM}$ are represented by shaded rectangles 41RU, 51RU, 61RU, and 71RU respectively along time lines 40\*, 50\*, 60\*, and 70\*. Leading and trailing edges of light pulses 41RU, 51RU, 61RU, and 71RU are indicated by dashed lines respectively labeled "$LE_{RU}$" and "$TE_{RU}$".

Leading edges $LE_{RL}$ of the reflected light pulses reach GT-TOF camera 20 at time $t_L = (t_1 - \tau_p)$ and the trailing edges $TE_{RL}$ reach the camera at time $t_1$ just as the camera is gated ON for binary-exposure gate G40 to receive light reflected from light pulse train 40 and too late to provide light incident on the camera during gate G40. Were the trailing edge $TE_{RL}$ of reflected light pulse 41RL, just a bit later than shown in FIG. 2B, light from light pulse 41RL would reach photosensor 22 (FIG. 1) after GT-TOF camera 20 was gated ON for exposure period G40$e_a$, and a pixel in the photosurface would register the light. However, with trailing edges $TE_{RL}$ of light pulses 41RL, 51RL, 61RL, and 71RL reaching GT-TOF camera at time $t_1$, none of the reflected light pulses overlap a gate G40, G50, G60 or G70 respectively of the camera. GT-TOF camera 20 does not therefore register any light from the feature that reflected reflected light pulses 41RL, 51RL, 61RL, and 71RL and GT-TOF camera 20 cannot provide a distance to the feature. The feature and features at distances from GT-TOF camera 20 less than $D_{LM}$ are out of range.

Leading and trailing edges of light pulses 41RU, 51RU, 61RU, and 71RU are similarly indicated by dashed lines respectively labeled $LE_{RU}$ and $TE_{RU}$. Light at leading edges $LE_{RU}$ of reflected light pulses 41RU, 51RU, 61RU, and 71RU reach GT-TOF camera 20 at time $t_U = (t_6 + \tau_p)$ just as the camera is gated OFF at the end of exposure period G60$e_b$ of binary gate G60. Were leading edges $LE_{RU}$ of the light pulses just a bit earlier, light from light pulse 61RU would be incident on photosensor 22 during exposure period G60$e_b$ of binary-exposure gate G60 and a pixel in the photosensor would register the incident light. However, with leading edges of reflected light pulses 41RU, 51RU, 61RU, and 71RU reaching GT-TOF camera 20 at time $t_{UM}$ light in reflected light pulses 41RU, 51RU, 61RU, and 71RU is too late to be incident on GT-TOF camera 20 during gates G40, G50, G60, and G70 respectively associated with transmitted light pulses 41, 51, 61, and 71. GT-TOF camera 20 therefore does not register any light from the feature that reflected the reflected light pulses and GT-TOF camera 20 cannot provide a distance to the feature. The feature and features at distances from GT-TOF camera 20 greater than $D_{UM}$ are out of range.

Gating configuration 100 therefore provides a maximum depth range DR-M given by an expression $$DR\text{-}M = (D_{UM} - D_{LM}) = (t_U - t_L)c/2 = (t_6 + \tau_p)c/2 - (t_1 - \tau_p)c/2 = (t_6 - t_1 + 2\tau_p)c/2. \quad (1)$$

Remembering that exposure periods of binary-exposure gates G40 and G60, and exposure periods of single-exposure gates G50 and G70 in gating configuration 100 optionally have a same duration $\tau_p$ and temporally adjacent exposure periods are delayed with respect to each other by a relative delay $\tau_{rd}$, $(t_6 - t_1) = 5\tau_{rd}$, and equation (1) may be rewritten $$DR\text{-}M = (D_{UM} - D_{LM}) = (5\tau_{rd} + 2\tau_p)c/2 \quad (2)$$

It is noted that a depth range of a GT-TOF camera may conventionally be extended by operating the camera to image a scene with transmitted light pulses from N transmitted light pulse trains. Following a transmission time of each transmitted light pulse in a given pulse train of the N pulse trains, the GT-TOF camera is gated ON for a single-exposure gate. The ON times, relative to pulse transmission times, of exposure periods associated with light pulses in different pulse trains are different and may be delayed relative to each other by a time interval $\tau_{rd}$. For N pulse trains a conventional GT-TOF camera having a conventionally extended maximum depth range "DR-$M_C$" may therefore have a depth range substantially equal to, $$DR\text{-}M_C(N) = ((N-1)\tau_{rd} + 2\tau_p)c/2. \quad (3)$$

Assuming that the conventional GT-TOF camera uses a same number of light pulse trains as used by gating configuration 100, N=4 and $$DR\text{-}M_C(4) = (3\tau_{rd} + 2\tau_p)c/2. \quad (4)$$

A ratio, a range ratio "RR-M", of a maximum extended depth range provided by gating configuration 100 to a conventional maximum extended depth range may therefore be written $$RR\text{-}M = (5\tau_{rd} + 2\tau_p)/(3\tau_{rd} + 2\tau_p). \quad (5)$$

And assuming, as in gating configuration 100, that $\tau_{rd} = (2/3)\tau_p$ $$RR\text{-}M = (16/3)\tau_p/(12/3)\tau_p = 4/3. \quad (6)$$

For a same set of a plurality of four light pulse trains used to illuminate a scene to provide a range image of the scene, GT-TOF camera 20 provides a maximum range depth that is 4/3 greater than a maximum range depth provided by a conventionally operating GT-TOF camera.

For a feature in scene 30 located at a distance from GT-TOF camera 20 between $D_{LM}$ and $D_{UM}$, a pixel 23 in the camera on which the feature is imaged accumulates photocharge for each light pulse train 40, 50, 60 and 70 responsive to light reflected by the feature from transmitted light pulses 41, 51, 61, and 71 that is incident on the camera during gates G40, G50, G60, and G70 respectively. The accumulated photocharges provide measures of amounts of light incident on the pixel from transmitted light pulses 41, 51, 61, and 71, which GT-TOF camera 20 may process in accordance with an embodiment of the disclosure to determine a distance of the feature from the camera.

Figure 2C:
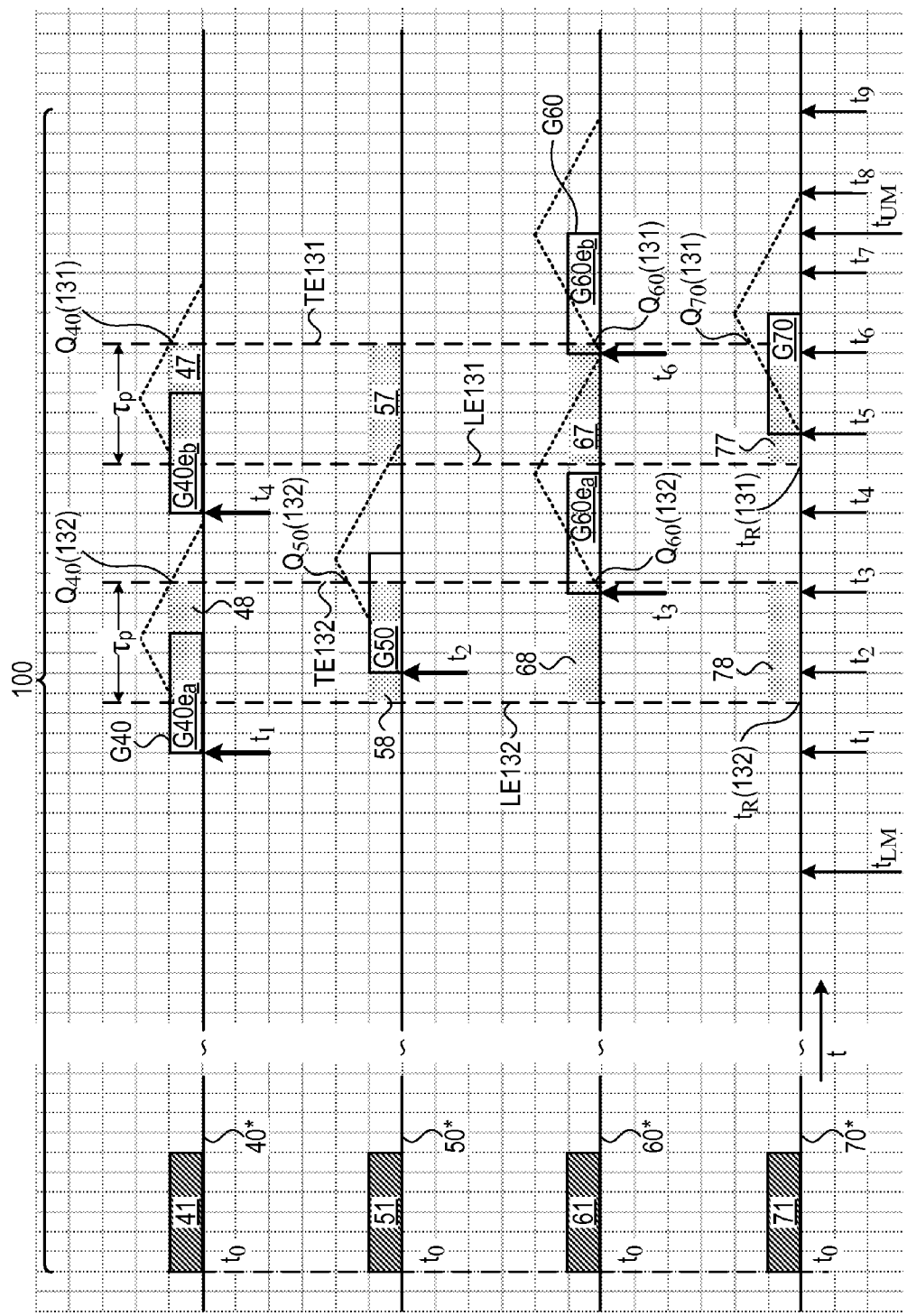
FIG. 2C shows a schematic time line graph of the gating configuration shown in FIG. 2A that illustrates temporal relationships between the multi and single-exposure gates and light pulses reflected from features in the scene shown in FIG. 1 that are located within the depth range of the GT-TOF camera, in accordance with an embodiment of the disclosure.

By way of example, FIG. 2C graphically, schematically illustrates amounts of photocharge accumulated by pixel 23-132 (also shown in FIG. 1) on which feature 132 in scene 30 is imaged by GT-TOF camera 20 responsive to light reflected by the feature from transmitted light pulses 41, 51, 61, and 71, that is incident on GT-TOF camera 20. The incident light reaches GT-TOF camera 20 as reflected light pulses represented by shaded rectangles 48 (see also FIG. 1), 58, 68, and 78 respectively. FIG. 2C also graphically, schematically illustrates photocharge accumulated by pixel 23-131 (FIG. 1) on which feature 131 in scene 30 is imaged by GT-TOF camera 20 responsive to light reflected by the feature from transmitted light pulse 41, 51, 61, and 71. The incident reflected light from feature 131 reaches GT-TOF camera 20 as reflected light pulses represented by shaded rectangles 47 (see also FIG. 1), 57, 67, and 77 respectively.

Reflected light pulses 48, 58, 68, and 78 have leading and trailing edges indicated by dashed lines labeled LE132 and TE132 respectively. Light in the reflected light pulses reaches GT-TOF camera 20 after a round trip time $t_R(132)$ indicated for light at leading edges LE132 of reflected light pulses 48, 58, 68, and 78 along time line 70\*. An amount of photocharge that pixel 23-132 accumulates responsive to light in a reflected light pulse 48, 58, 68, and 78 is graphically represented by an amount by which the reflected light pulse overlaps a gate G40, G50, G60 and G70 respectively. Intersections of trailing edge dashed line TE132 with correlation functions CF40, CF50, CF60, and CF70 associated with gates G40, G50, G60, and G70 also represent amounts of the photocharge accumulated by pixel 23-132 responsive to reflected light pulses 48, 58, 68, and 78.

FIG. 2C shows that for the distance from GT-TOF camera 20 at which feature 132 is located, light in reflected light pulses 48, 58, and 68 is registered by pixel 23-132 during exposure period G40$e_a$ of binary gate G40, during gate G50, and during exposure period G60$e_a$ of binary gate G60. However, pixel 23-132 does not register light from reflected light pulse 78 because light in reflected light pulse 78 reaches GT-TOF camera 20 before the camera is gated ON for gate G70.

Let the amounts of photocharge accumulated by pixel 132 during gates G40, G50, and G60 be represented by $Q_{40}$(132), $Q_{50}$(132), and $Q_{60}$(132). In FIG. 2C, $Q_{40}$(132), $Q_{50}$(132), and $Q_{60}$(132) label intersections of trailing edge dashed line TE132 with correlation functions CF40, CF50, CF60. It is noted that an amount of photocharge $Q_{40}$(132) accumulated by pixel 23-132 during binary-exposure gate G40 does not provide any information as to whether the photocharge was accumulated responsive to light incident on pixel 23-132 during exposure period G40$e_a$ or exposure period G40$e_b$ of the binary-exposure gate. However, the accumulation of photocharge $Q_{50}$(132) by pixel 23-132 during gate G50 indicates that photocharge was accumulated during exposure period G40$e_a$ and not during exposure period G40$e_b$. GT-TOF camera 20 may therefore determine that trailing edge TE132 of reflected light pulses 48, 58, 68, and 78 reach the camera between times $t_3$ and $t_4$ and that a round trip time $t_R$(132) from the camera to feature 132 and back to the camera may, for substantially rectangular transmitted light pulses 41-71 and substantially rectangular gates G40-G70, optionally be given by an expression, $$t_R(132)=[t_1+\tau_p(1-Q_{40}(132)/Q_o)]=[t_3-\tau_p(1-Q_{60}(132)/Q_o)] \quad (7)$$

for which, distance d(132), to the feature, may be written d(132)=$t_R$(132)c/2.

In expression (7) $Q_o$ is an amount of photocharge accumulated by pixel 23-132 if a light pulse reflected from feature 132 is coincident with an exposure period of the gate and completely overlaps the gate. $Q_o$, also referred to as a normalization photocharge, may generally be determined from photocharge accumulated during exposure periods of different gates or may be removed from equations for $t_R$(132) by manipulation of the equations. For example, the expression following the second equals sign in equation (7) may be manipulated to provide an expression for $Q_o$ in terms of $t_R$(132), $t_3$ and $Q_{60}$(132) and the expression for $Q_o$ substituted into the expression for $t_R$(132) following the first equals sign.

Similarly, reflected light pulses 47, 57, 67, and 77 from feature 131 (FIG. 1) are represented in FIG. 2C by shaded rectangles having leading and trailing edges indicated by dashed lines labeled LE131 and TE131 respectively. Light in the reflected light pulses reaches GT-TOF camera 20 after a round trip time $t_R$(131) indicated for light at leading edge dashed line LE131 along time line 70*. For a distance d(131) from GT-TOF camera 20 at which feature 131 is assumed to be located, pixel 23-131 accumulates photocharge $Q_{40}$ (131), $Q_{60}$ (131), and $Q_{70}$(131) during gates G40, G60, and G70 but does not accumulate photocharge responsive to light from feature 131 during gate G(50). Whereas feature 131 is farther from GT-TOF camera 20 than feature 132 (FIG. 1), for assumed distance d(131) the amounts of accumulated photocharge $Q_{40}$(131) and $Q_{60}$(131) are substantially equal to photocharge $Q_{40}$(132) and $Q_{60}$(132) accumulated for feature 132. However, photocharge responsive to reflected light from feature 131 is accumulated during gate G70 but not during gate G50 indicating that photocharge Q40 (131) and $Q_{60}$(131) is accumulated during exposure periods G40$_{eb}$ and G60$_{eb}$ and not during exposure periods G40$_{ea}$ and G60$_{ea}$. As a result, GT-TOF camera 20 may determine that trailing edges TE131 of reflected light pulses 47, 57, 67, and 77 reach the camera between times $t_6$ and $t_7$ and a round trip time $t_R$(131) from the camera to feature 131 and back to the camera may optionally be given by an expression:

$$t_R(131)=(t_6-\tau_p(1-Q_{60}(131)/Q_o))=(t_4+\tau_p(1-Q_{40}(131)/Q_o)). \quad (8)$$

Expressions (7) and (8) enable calculation of round trip times $t_R$(132) and $t_R$(131) for features 132 and 131, assuming transmitted light pulses 41-71 and gates G40-G70, because the expressions provide a set of two simultaneous equations in two unknowns. Expression (7) for example provides two equations, $t_R$(132)=[$t_1+\tau_p(1-Q_{40}(132)/Q_o)$] and $t_R$(132)=[$t_3-\tau_p(1-Q_{60}(132)/Q_o)$] in the unknowns $t_R$(132) and $Q_o$. The two equations are generated from measurements of photocharge for at least two gates. In the case of expression (7) the measurements are photocharges $Q_{40}$ and $Q_{60}$ acquired for gates G40 and G60.

Figure 2D:
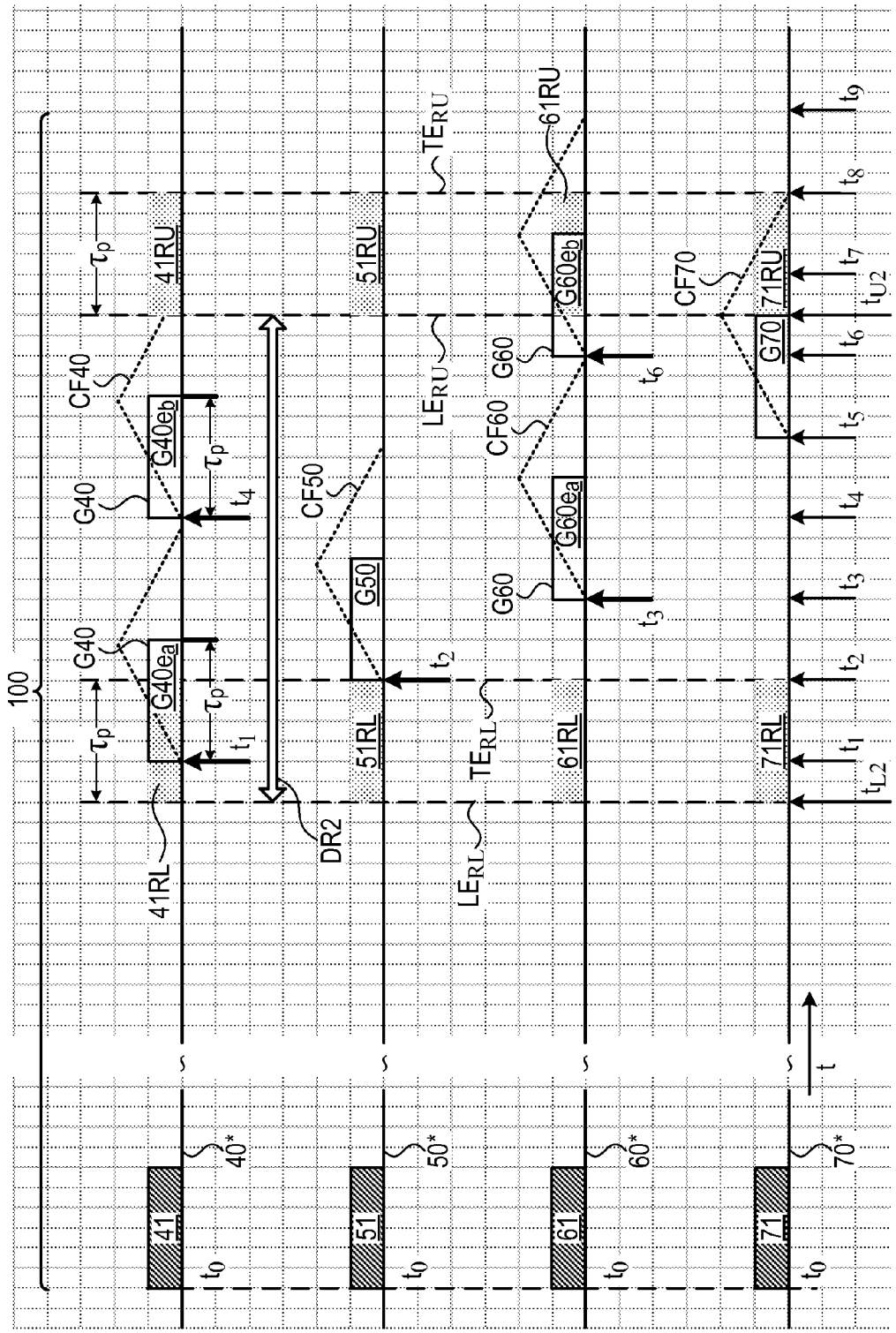
FIGS. 2D and 2E show schematic time lines illustrating depth ranges for the gating configuration shown in FIG. 2A having different characteristics, in accordance with an embodiment of the disclosure.

Photocharge measurements for a feature in scene 30 for at least two gates are acquired by GT-TOF camera 20 for a depth range, DR2, of GT-TOF camera 20 that is smaller than the depth range DR-M shown in FIG. 2B. As shown in FIG. 2B depth range DR-M extends between distances for which trailing edges, of reflected light pulses from features in scene 30, for example trailing edges TE132 or TE131 (FIG. 2C) of reflected light pulses from features 132 and 131 lie between times $t_1$ and $t_9$. Smaller depth range DR2 indicated in a FIG. 2D by a block arrow labeled DR2 on the other hand extends for distances for which trialing edges of light pulses lie between times $t_2$ and $t_8$, and corresponding round trip times lie between $t_{L2}$ and $t_{U2}$. Reflected light pulses 41RL, 51RL, 61RL, and 71RL having trailing edges TE$_{RL}$ located at time $t_2$ and reflected light pulses 41UL, 51UL, 61UL and 71UL having trailing edges TE$_{UL}$ located at time $t_8$, are shown in FIG. 2D. Round trip times $t_{L2}$ and $t_{U2}$ that correspond to times $t_2$ and $t_8$ and define upper and lower distance bounds for range DR2 are also shown in FIG. 2D. Range DR2 for gating configuration 100 has an extent $$DR2=(2\tau_p+3\tau_{rd})c/2. \quad (9)$$

A conventional range DR2$_C$ for which a GT-TOF camera using a conventional four gate gating configuration acquires measurements of photocharge for two gates may be given by an expression $$DR2_C=(2\tau_p+\tau_{rd})c/2. \quad (10)$$

And a range ratio RR-2 for DR2 relative to DR2$_C$ assuming that $\tau_{rd}=(\frac{2}{3})\tau_p$ may be written, $$RR-2=DR2/DR2_C=4\tau_p/(8/3)\tau_p=1.5. \quad (11)$$

Whereas expressions (7) and (8) given above by way of example, take into account normalization photocharge $Q_o$, photocharge registered by a pixel 23 (FIG. 1) during a gate is usually adulterated by photocharge generated responsive to ambient, "background", light incident on the pixel and pixel dark current. For example if $Q_{T40}$(132) and $Q_{T60}$(132) represent total amounts of photocharge accumulated by pixel 23-132 (FIG. 1) during gates G40 and G60 respectively then in equation (7) $Q_{40}$ (132)=$Q_{T40}$(132)−$Q_B$ and $Q_{60}$(132)=$Q_{T60}$(132)−$Q_B$, where $Q_B$ represents photocharge generated by background light and dark current. Advantageously GT-TOF camera 20 acquires and uses photocharge measurements for three gates to remove or moderate effects of background light on determination of round trip times and distance measurements.

Measurements of photocharge for three gates generally provide sufficient information useable to remove or moderate effects of background light on determinations of round trip times and corresponding distances. For example, for feature 132 at a distance from GT-TOF camera 20 shown in FIG. 2C the camera accumulates total amounts of photocharge $Q_{T40}$ (132), $Q_{T50}$ (132), and $Q_{T60}$(132) during gates G40, G50, and G60. The accumulated photocharges may be used to provide a set of three simultaneous equations in unknowns $t_R$(132), $Q_B$, and $Q_o$ that are solvable for $t_R$(132):

$$\left. \begin{array}{l} t_R(132) = [t_1 + \tau_p(1 - (Q_{T40}(132) - Q_B)/Q_O)]; \\ t_R(132) = [t_3 - \tau_p(1 - (Q_{T60}(132) - Q_B)/Q_O)]; \text{ and} \\ t_R(132) = [t_1 - \tau_p(1 - (Q_{T50}(132) - Q_B)/Q_O)] \end{array} \right\} \quad (12)$$

Figure 2E:
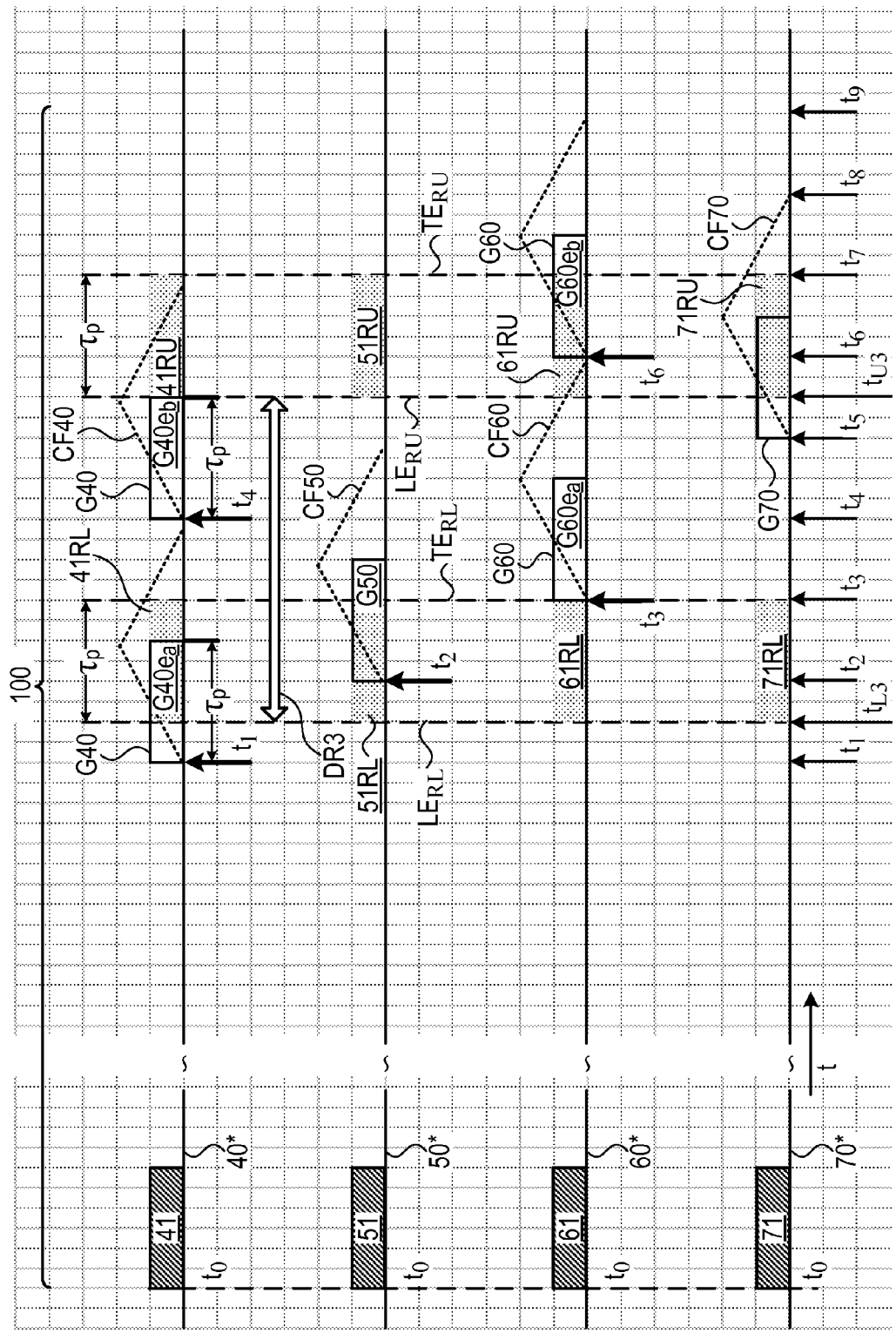

GT-TOF camera 20 acquires photocharge measurements for three gates of gating configuration 100 for features in scene 30 for a depth range DR3 schematically indicated in FIG. 2E by a block arrow labeled DR3, which is smaller than depth range DR2 (FIG. 2D). Depth range DR3 extends for distances for which trialing edges of reflected light pulses from features in scene 30 arrive at GT-TOF camera 20 between times $t_3$ and $t_7$, and corresponding round trip times $t_R$ lie between times $t_{L3}$ and $t_{U3}$. Reflected light pulses 41RL, 51RL, 61RL, and 71RL from features in scene 30 located at a lower bound distance of range DR3 having trailing edges TE$_{RL}$ at time $t_3$ and reflected light pulses 41UL, 51UL, 61UL and 71UL for features in scene 30 located at an upper bound distance of range DR3 having trailing edges TE$_{RU}$ at time $t_7$, are shown in a FIG. 2E. Round trip times $t_{L2}$ and $t_{U2}$ that correspond to times $t_3$ and $t_7$ and define upper and lower distance bounds for range DR2 are also shown in FIG. 2E. Range DR3 for gating configuration 100 has an extent, $$DR3 = (2\tau_p + \tau_d)c/2. \quad (13)$$

A conventional range DR$3_C$ for which a GT-TOF camera using a conventional four gate gating configuration registers photocharge for three gates may be given by an expression $$DR3_C = (2\tau_p - \tau_{rd})c/2. \quad (14)$$

And a range ratio RR-3 for DR3 relative to DR$3_C$ assuming that $\tau_{rd} = (2/3)\tau_p$ may be written, RR-3=DR3/DR$3_C$=(8/3)$\tau_p$/(4/3)$\tau_p$=2.

A table below gives expressions for round trip time $t_R$ for a feature in scene 30 as a function of photocharges $Q_{40}$, $Q_{50}$, $Q_{60}$, and/or $Q_{70}$ that may be accumulated by a pixel 23 imaging the feature responsive to reflected light from the feature. A first column in the table lists photocharge $Q_{40}$, $Q_{50}$, $Q_{60}$, and/or $Q_{70}$ accumulated by GT-TOF camera 20 during gates G40, G50, G60, and G70 responsive to light reflected by the feature from light pulse trains 40, 50, 60, and 70 that the camera transmits to illuminate the scene. If a photocharge is not listed in a cell in the first column it is not accumulated for a distance at which the feature is located from GT-TOF camera 20. A second column provides the distance range DR-M, DR2, or DR3 for a distance at which a feature for which the photocharges listed in the first column are accumulated is located. A third column headed "AND" lists a relationship between accumulated photocharges listed in the first column. For the photocharge noted as accumulated in the first column and the condition entered in the second column, a cell in the third column lists a time interval during which a trailing edge of a light pulse reflected by the feature reaches GT-TOF camera 20. A last column provides a formula or formulae that may be used to determine the round trip time for the feature responsive to the photocharge listed in the first column. For convenience of presentation the formulae in the last column assume that $Q_B$ is zero.

It is noted that the formulae in the table assume, as shown in FIGS. 2A-2E, that correlation functions CF40, CF50, CF60, and CF70 are rectilinear triangular functions. Correlation functions CF40, CF50, CF60, and CF70 are rectilinear and triangular because they represent correlation functions assuming that gates G40, . . . G70, transmitted light pulses 41, . . . , 71, and light pulses reflected from the transmitted light pulses have a same duration and may be represented by idealized, rectangular functions. Idealized rectangular representations of light pulses and gates, and rectilinear triangular correlation functions CF40, CF50, CF60, and CF70 are useful in visually representing and understanding features of a gating configuration in accordance with an embodiment of the disclosure. However whereas light pulses, gates, and correlation functions may usefully be approximated by idealized shapes, in practice, light pulses, gates, and correlation functions of a gating configuration, in accordance with an embodiment of the disclosure, assume more complex and irregular shapes. A GT-TOF camera, in accordance with an embodiment of the disclosure, such as GT-TOF camera 20, may therefore advantageously use formulae or an algorithm for processing photocharges accumulated by the camera that are different from or not implied by those shown in the table. The formulae may be modified or algorithm configured to account for the more complex and irregular shapes that may characterize transmitted light pulses and gates that the GT-TOF camera might use.

| ACCUMULATED PHOTOCHARGE | RANGE | AND | THEN | AND $t_R$ EQUALS |
|---|---|---|---|---|
| NONE | | | $t_{TE} < t_1$ | OUT OF RANGE |
| $Q_{40}$ | DR-M | | $t_1 < t_{TE} < t_2$ | $t_R = [t_1 - \tau_p(1 - Q_{40}/Q_o)]$ |
| $Q_{40}, Q_{50}$ | DR2 | | $t_2 < t_{TE} < t_3$ | $t_R = [t_2 - \tau_p(1 - Q_{50}/Q_o)]$; AND If $Q_{40}/Q_{50} > 3$: $t_R = [t_1 - \tau_p(1 - Q_{40}/Q_o)]$; else $t_R = [t_1 + \tau_p(1 - Q_{40}/Q_o)]$. |
| $Q_{40}, Q_{50}, Q_{60}$ | DR3 | $Q_{50} > Q_{60}$ | $t_3 < t_{TE} < t_4$ | $t_R = [t_1 + \tau_p(1 - Q_{40}/Q_o)]$; AND $t_R = [[t_2 - \tau_p(1 - Q_{50}/Q_o)]$; AND If $Q_{50}/Q_{60} > 3$: $t_R = [t_1 - \tau_p(1 - Q_{50}/Q_o)]$; else $t_R = [t_1 + \tau_p(1 - Q_{50}/Q_o)]$. |

-continued

| ACCUMULATED PHOTOCHARGE | RANGE | AND | THEN | AND $t_R$ EQUALS |
|---|---|---|---|---|
| $Q_{40}, Q_{50}, Q_{60}$ | DR3 | $Q_{50} < Q_{60}$ | $t_4 < t_{TE} < t_5$ | $t_R = [t_4 - \tau_p(1 - Q_{40}/Q_o)]$; AND $t_R = [t_2 + \tau_p(1 - Q_{50}/Q_o)]$; AND If $(Q_{60}/Q_{50}) > 3$: $t_R = [t_3 - \tau_p(1 - Q_{60}/Q_o)]$; else $t_R = [t_3 + \tau_p(1 - Q_{60}/Q_o)]$ |
| $Q_{40}, Q_{60}, Q_{70}$ | DR3 | $Q_{70} < Q_{40}$ | $t_5 < t_{TE} < t_6$ | $t_R = [t_5 + \tau_p(1 - Q_{70}/Q_o)]$; AND $t_R = [t_3 + \tau_p(1 - Q_{60}/Q_o)]$; AND If $Q_{(40}/Q_{70}) > 3$: $t_R = [t_4 - \tau_p(1 - Q_{40}/Q_o)]$; else $t_R = [t_4 + \tau_p(1 - Q_{40}/Q_o)]$ |
| $Q_{40}, Q_{60}, Q_{70}$ | DR3 | $Q_{70} > Q_{40}$ | $t_6 < t_{TE} < t_7$ | $t_R = [t_6 - \tau_p(1 - Q_{60}/Q_o)]$; AND $t_R = [t_4 + \tau_p(1 - Q_{40}/Q_o)]$; AND If $Q_{(70}/Q_{60}) > 3$: $t_R = [t_5 - \tau_p(1 - Q_{70}/Q_o)]$; else $t_R = [t_5 + \tau_p(1 - Q_{70}/Q_o)]$ |
| $Q_{60}, Q_{70}$ | DR2 | | $t_7 < t_{TE} < t_8$ | $t_R = [t_5 + \tau_p(1 - Q_{70}/Q_o)]$; AND If $(Q_{60}/Q_{70}) > 3$: $t_R = [t_6 + \tau_p(1 - Q_{60}/Q_o)]$; else $t_R = [t_6 - \tau_p(1 - Q_{60}/Q_o)]$ |
| $Q_{60}$ | DR-M | | $T_8 < t_{TE} < t_9$ | $t_R = [t_6 + \tau_p(1 - Q_{60}/Q_o)]$ |
| NONE | | | $T_9 < t_{TE}$ | OUT OF RANGE |

Figure 3:
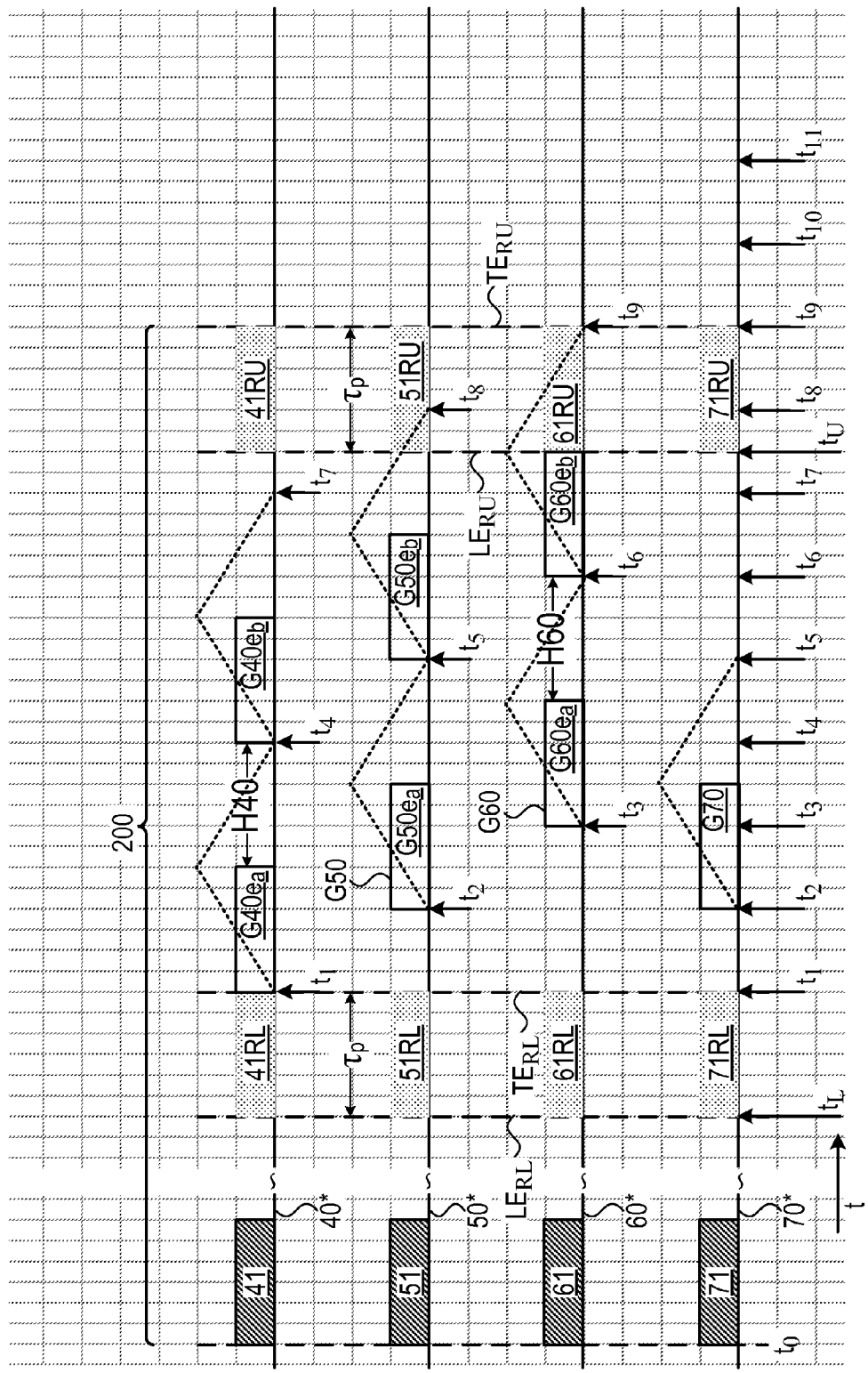
FIG. 3 shows a a schematic time line graph of a gating configuration comprising three multi-exposure gates and a single exposure gate in accordance with an embodiment of the disclosure.

Whereas gating configuration 100 comprises two binary gates G40 and G60 and two single single-exposure gates, G50 and G70 a gating configuration in accordance with an embodiment of the disclosure is not limited to two multi-exposure gates that are binary. For example, FIG. 3 shows a schematic timeline graph illustrating a gating configuration 200 comprising three optionally binary gates G40, G50, G60 and a single exposure gate G70. FIG. 3 is similar to FIG. 2B and shows reflected light pulses 41RL . . . 71RL from a feature at a lower bound distance $D_{LM}$ of a maximum depth range provided by gating configuration 200 and reflected light pulses 41RU . . . 71RU from a feature at an upper bound distance $D_{UM}$ of the depth range. Gating configuration 200 provides for four light pulse trains a depth range $$DR = (D_{UM} - D_{LM}) = ((13/2)\tau_{rd} + \tau_p)c/2, \quad (15)$$

and assuming, as in gating configuration 100 and equation (6), that $\tau_{rd} = (\frac{2}{3})\tau_p$ a range ratio $$RR = (16/3)\tau_p/(12/3)\tau_p = 1\frac{1}{3}. \quad (16)$$

It is noted that FIGS. 2A-2E and FIG. 3 schematically show gating configurations in accordance with embodiments of the disclosure for which width of transmitted light pulses are equal to widths of gate exposure periods. However, practice of an embodiment of the disclosure is not limited to gating configurations having light pulse widths equal to the widths of gate exposure periods. Advantageously, a GT-TOF camera in accordance with an embodiment of the invention may operate using a gating configuration for which pulse widths are smaller than duration of gate exposure periods. For example, for transmitted light pulses having an irregular shape, a gating configuration may have gate exposure periods as much as 125% longer than pulse widths of the transmitted light pulses. The longer gate exposure periods may be advantageous for improving resolution and/or precision of feature distances that a GT-TOF camera in accordance with an embodiment of the disclosure provides.

It is also noted that it is assumed in the above discussion that a different train of light pulses is transmitted to illuminate a scene for each different multi-exposure and single exposure gate for which a GT-TOF camera is gated ON. However, a photosensor may comprise CMOS smart pixels having a plurality of different storage regions for photocharge. The pixels may be controllable to accumulate photocharge generated by light incident on the pixels during different gates in different storage regions of the plurality of storage regions. A GT-TOF camera comprising such a photosensor may be controlled to accumulate photocharge for different gates, for example gates G40, G50, G60 and G70, from reflected light pulses reflected from light pulses transmitted in a same single train of light pulses.

It is further noted that whereas in the above described examples gating configurations comprised four gates, practice of an embodiment is not limited to four gates but may comprise for example five or more different gates.

It is additionally noted that whereas multi-exposure gates in the figures and discussion are shown and described as having at least first and second exposure periods separated by a hiatus following a same transmitted light pulse, a multi-exposure gate may be implemented by a plurality of exposure periods each following a different transmitted light pulse. For example, a pixel may be controlled to register light during a first exposure period having a first ON time following transmission of a first light pulse and subsequently during a second exposure period having a second ON time following a different, second light pulse, wherein the second ON time is substantially equal to the first ON time plus a sum of a width of the first exposure period and a hiatus. If the pixel is read only after registering light following the second exposure period, an amount of light registered by the pixel will be substantially equal to an amount of light the pixels would have registered for a multi-exposure gate following a same transmitted light pulse and comprising the first and second exposure periods having the first and second ON times respectively.

There is therefore provided in accordance with an embodiment of the disclosure, gated time of flight (GT-TOF) camera operable to determine distances to features in a scene, the GT-TOF camera comprising: a light source configured to transmit at least one train of light pulses to illuminate the scene; a photosensor comprising pixels configured to register amounts of light reflected from transmitted light pulses in the at least one light pulse train by features in the scene imaged on the pixels; a controller configured to gate ON the photosensor following each of a first plurality of transmitted light pulses in the at least one light pulse train for a first multi-exposure gate having a plurality of exposure periods to register first amounts of light reflected by features in the scene from the first plurality of light pulses.

Optionally, the controller is configured to gate ON the photosensor following each of a second plurality of transmitted light pulses for a first single-exposure gate having a single exposure period to register second amounts of light reflected by features in the scene from the second plurality of light pulses. Optionally, the controller determines a distance to a feature in the scene based on first and second amounts of reflected light that a pixel registers for the feature and during which exposure period of the first multi-exposure gate the pixel registered the first amount of light determined based on the first and second amounts of reflected light registered by the pixel for the feature.

In an embodiment of the disclosure, the multi-exposure period comprises three or more exposure periods.

In an embodiment of the disclosure, the controller gates ON the photosensor for a second multi-exposure gate following each of a third plurality of transmitted light pulses in the at least one light pulse train to register third amounts of light reflected from the third plurality of light pulses by features in the scene. Optionally, each of the first and second multi-exposure periods comprises three or more exposure periods.

In an embodiment of the disclosure, the controller gates ON the photosensor for a second single-exposure gate comprising a plurality of exposure periods and following each of a fourth plurality of transmitted light pulses in the at least one light pulse train to register fourth amounts of light reflected from the fourth plurality of light pulses by features in the scene. Optionally, the controller determines a distance to a feature in the scene based on at least one of the first and third amounts of reflected light that a pixel registers for the feature and during which of the exposure periods of the at least one multi-exposure gates the pixel registered the at least one of the first and third amounts of reflected light for the feature. Optionally, the controller determines during which of the exposure periods of the first and second multi-exposure gates reflected light was registered by the pixel based on at least one of the first, second, third, and fourth amounts of light the pixel registers for the pixel.

In an embodiment of the disclosure, the exposure periods of the first and second multi-exposure gates have a same duration. Optionally, the exposure periods are temporally separated by a hiatus having duration substantially equal to the duration of the exposure periods. Optionally, the exposure periods of the first and second single-exposure gates have duration substantially equal to the duration of the exposure periods of the multi-exposure gates. Optionally, relative to transmission times of the light pulses that they respectively follow, the ON times of different exposure periods are different, and different ON times that are temporally adjacent differ by a same time interval. Optionally, the transmitted light pulses have a same pulse width and the time interval is substantially equal to two thirds of the pulse width. Optionally, the exposure periods of the single-exposure gates and multi-exposure gates have durations substantially equal to the pulse width of the light pulses.

In an embodiment of the disclosure, the third and fourth pluralities of transmitted light pulses are transmitted in different first and second light pulse trains.

In an embodiment of the disclosure, the first and second pluralities of transmitted light pulses are transmitted in different first and second light pulse trains.

There is further provided in accordance with an embodiment of the disclosure a method of determining distances to features in a scene the method comprising: transmitting at least one train of light pulses to illuminate the scene; following each light pulse of a first plurality of transmitted light pulses in the at least one light pulse train registering light reflected by a feature in the scene from the light pulse during an exposure period of a first multi-exposure gate having a plurality of exposure periods; and using the reflected registered light to determine a distance to the feature. Optionally, following each light pulse of a second plurality of transmitted light pulses in the at least one light pulse train, the method comprises registering light reflected by the feature from the light pulse during a single-exposure gate having a single exposure period and using the reflected light registered during the single exposure gate following the light pulse to determine the distance to the feature. Optionally, following each light pulse of an additional different plurality of light pulses in the at least one light pulse train, the method comprises registering light reflected by the feature from the light pulse during an exposure period of a second multi-exposure gate having a plurality of exposure periods; and using the reflected light registered during the second multi-exposure gate to determine a distance to the feature.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A gated time of flight (GT-TOF) camera operable to determine distances to features in a scene, the GT-TOF camera comprising:
   a light source configured to transmit at least one train of light pulses to illuminate the scene;
   a photosensor comprising pixels configured to register amounts of light reflected from transmitted light pulses in the at least one light pulse train by features in the scene imaged on the pixels;
   a controller configured to gate ON the photosensor following each of a first plurality of transmitted light pulses in the at least one light pulse train for a first multi-exposure gate having a plurality of exposure periods and a hiatus between consecutive exposure periods to register first amounts of light reflected by features in the scene from the first plurality of light pulses, gate ON the photosensor following each of a second plurality of transmitted light pulses for a first single-exposure gate having a single exposure period to register second amounts of light reflected by features in the scene from the second plurality of light pulses, and determine a distance to a feature in the scene based on first and second amounts of reflected light that a pixel registers for the feature.

2. The GT-TOF camera according to claim 1 wherein the controller determines during which exposure period of the first multi-exposure gate the pixel registered the first amount of light based on the first and second amounts of reflected light registered by the pixel for the feature.

3. The GT-TOF camera according to claim 1 wherein the multi-exposure period comprises three or more exposure periods.

4. The GT-TOF camera according to claim 1 wherein the controller gates ON the photosensor for a second multi-exposure gate following each of a third plurality of transmitted light pulses in the at least one light pulse train to register third amounts of light reflected from the third plurality of light pulses by features in the scene.

5. The GT-TOF camera according to claim 4 wherein at least one of the first and second multi-exposure periods comprises three or more exposure periods.

6. The GT-TOF camera according to claim 4 wherein the controller gates ON the photosensor for a second single-exposure gate following each of a fourth plurality of transmitted light pulses in the at least one light pulse train to register fourth amounts of light reflected from the fourth plurality of light pulses by features in the scene.

7. The GT-TOF camera according to claim 6 wherein the controller determines a distance to a feature in the scene based on at least one of the first and third amounts of reflected light that a pixel registers for the feature and during which of the exposure periods of the at least one multi-exposure gates the pixel registered the at least one of the first and third amounts of reflected light for the feature.

8. The GT-TOF camera according to claim 7 wherein the controller determines during which of the exposure periods of the first and second multi-exposure gates reflected light was registered by the pixel based on at least one of the first, second, third, and fourth amounts of light the pixel registers for the pixel.

9. A GT-TOF camera according to claim 6 wherein each of the exposure periods of the first and second multi-exposure gates have a substantially same duration.

10. The GT-TOF camera according to claim 9 wherein the exposure periods of the first and second single-exposure gates have duration substantially equal to the duration of each of the exposure periods of the multi-exposure gates.

11. The GT-TOF camera according to claim 6 wherein relative to transmission times of the light pulses that they respectively follow, the ON times of different exposure periods are different, and different ON times that are temporally adjacent differ by a same time interval.

12. The GT-TOF camera according to claim 11 wherein the time interval is substantially equal to one third of a duration equal to a sum of a duration of an exposure period plus a duration of a hiatus separating two consecutive exposure periods of the first multi-exposure gate.

13. The GT-TOF camera according to claim 12 wherein the duration of the exposure period and the hiatus are substantially equal.

14. The GT-TOF camera according to claim 12 wherein each of the exposure periods of the single-exposure gates and multi-exposure gates have substantially a same duration.

15. The GT-TOF camera according to claim 12 wherein the transmitted light pulses have a same pulse width, and the same duration of the exposure gates is substantially equal to the pulse width.

16. The GT-TOF camera according to claim 6 wherein at least two of the pluralities of light pulses are transmitted in different light pulse trains.

17. A method of determining distances to features in a scene the method comprising:
    transmitting at least one train of light pulses to illuminate the scene;
    following each light pulse of a first plurality of transmitted light pulses in the at least one light pulse train registering light reflected by a feature in the scene from the light pulse during a first multi-exposure gate having a plurality of exposure periods;
    following each light pulse of a second plurality of transmitted light pulses in the at least one light pulse train, registering light reflected by the feature from the light pulse during a single-exposure gate having a single exposure period and using the reflected light registered during the single exposure gate following the light pulse; and
    using the reflected light registered during the multi-exposure gate and the reflected light registered during the single exposure gate to determine a distance to the feature.

18. The method according to claim 17 and further comprising following each light pulse of a third plurality of light pulses in the at least one light pulse train, registering light reflected by the feature from the light pulse during an exposure period of a second multi-exposure gate having a plurality of exposure periods; and using the reflected light registered during the second multi-exposure gate to determine a distance to the feature.

* * * * *